Figure 1:
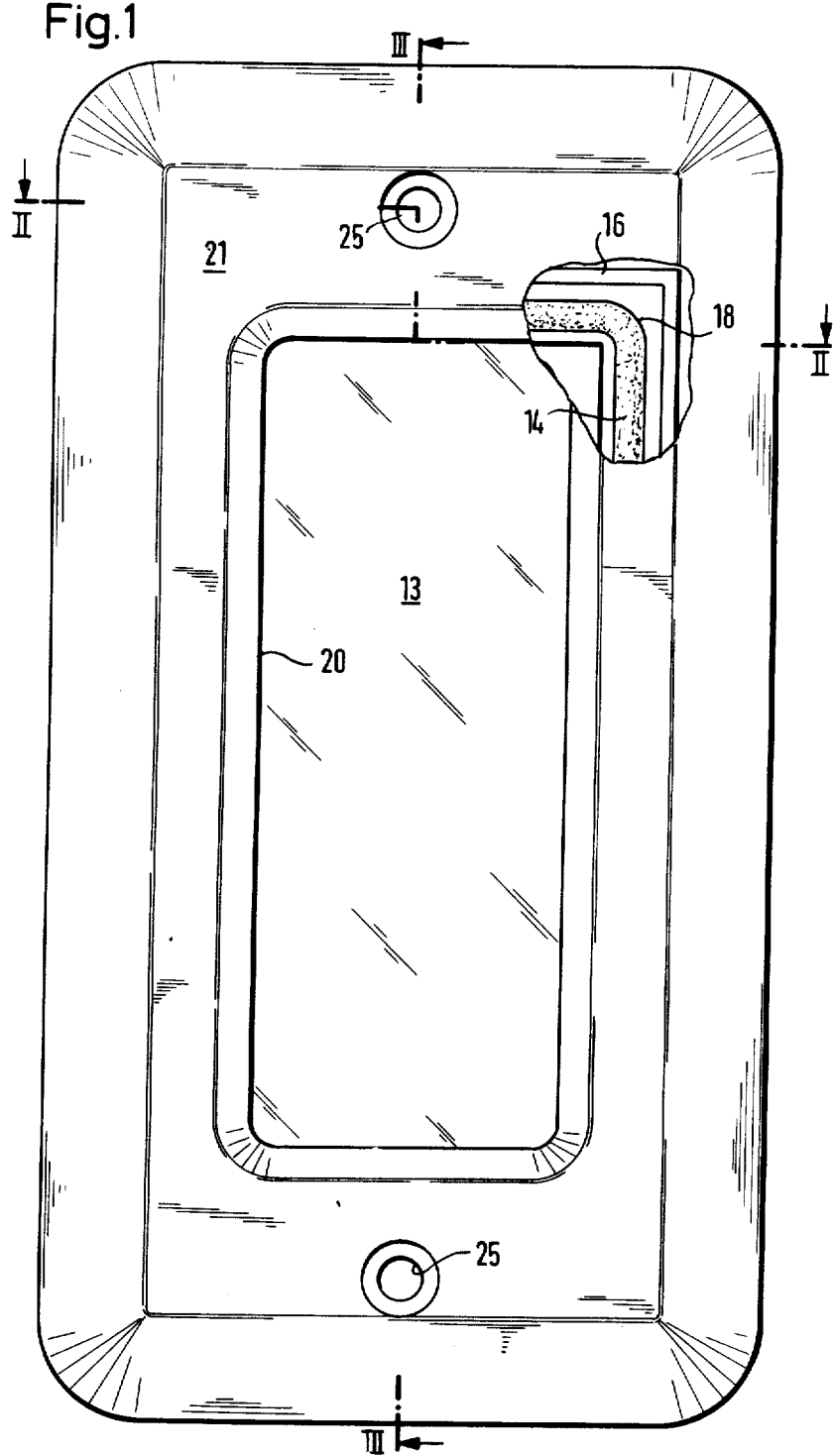

United States Patent [19]
Walter

[11] 3,945,714
[45] Mar. 23, 1976

[54] REFLECTOR FOR PHOTOELECTRONIC EQUIPMENT

[75] Inventor: Arthur A. W. Walter, Denzlingen, Germany

[73] Assignee: Erwin Sick Optik-Electronik, Waldkirch, Germany

[22] Filed: Mar. 1, 1974

[21] Appl. No.: 447,235

[30] Foreign Application Priority Data
Mar. 27, 1973 Germany............................ 2315261

[52] U.S. Cl................................... 350/103; 350/67
[51] Int. Cl.²......................................... G02B 5/124
[58] Field of Search ............. 350/102, 103, 104, 97, 350/105–109, 67

[56] References Cited
UNITED STATES PATENTS

| | | |
|---|---|---|
| 2,002,015 | 5/1935 | Kosten et al........................ 350/107 |
| 2,956,474 | 10/1960 | Holzwarth et al. ................ 350/67 X |
| 3,171,886 | 3/1965 | Holt et al............................... 350/67 |
| 3,458,245 | 7/1969 | Stanley........................... 350/103 X |

FOREIGN PATENTS OR APPLICATIONS

| | | |
|---|---|---|
| 1,164,744 | 5/1958 | France....................... 350/106 |
| 771,661 | 7/1934 | France....................... 350/106 |

Primary Examiner—John K. Corbin
Attorney, Agent, or Firm—Watts, Hoffmann, Fisher & Heinke Co.

[57] ABSTRACT

A reflector apparatus is disclosed for use in photoelectric applications. A housing is provided having an opening to accommodate a reflective element. A transparent plate is placed over the opening, with a sealing element interposed between the plate and the housing. Spring clips are provided to force the plate and housing together to effect a sealed reflector assembly.

14 Claims, 4 Drawing Figures

REFLECTOR FOR PHOTOELECTRONIC EQUIPMENT

The invention relates to a reflector for photoelectronic equipment with a housing open on one side, one or more reflector plates inserted therein and a transparent glass plate placed on the open side of the housing and which on all sides projects above the reflector plates.

Usually the housing is made from a cast, milled material e.g. a drawn aluminium section wherein the rectangular or hexagonal reflector segments are inserted in such a way that the desired reflector plate is formed. For example known triple reflectors are used as reflector segments. On the thus formed arrangement is placed a glass plate whose edges are firmly stuck or cemented to the housing.

According to another method the reflector member is made from plexiglass and firmly welded to the housing.

The first method has the disadvantage that it is difficult and costly to bring about the firm adhesion and in addition if the glass plate is broken it is difficult to replace. The second method has the disadvantage that the plexiglass surface of the reflector can be easily scratched, so that such a reflector has a very limited life.

The problem of the invention is to provide a reflector of the type described hereinbefore which can be economically manufactured and which can be easily repaired if damaged. It must in particular be suitable for use as a reflector light beam switch or light curtain such as are e.g. employed for securing the doors of trams.

According to the invention the problem is solved in that on the open side of the housing outside the area of the reflector plates is placed a sealing ring and that the glass plate is locked against the sealing ring by means of spring clips. Due to this construction a tightly sealed arrangement is obtained, whereby this is not dependent on the skill of assembly. If the glass plate is damaged it can be replaced by removing the springs and inserting a new plate. Manufacture is performed in an economic manner, with improved quality and substantially no maintenance.

According to a preferred embodiment the rectangular housing has a peripheral edge which is slightly lower than the glass plate, an annular step which follows the edge on the inside, a slot within the annular step for receiving the sealing ring and a reception chamber for the reflector plates within the annular step. Advantageously a cover plate which has a window in the area of the reflector plates is placed on the housing. On the cover plate window is provided a peripheral inner edge which rests on the glass plate. This leads not only to an attractive appearance of the overall arrangement but the said inner edge increases the uniform pressure on the glass plate, therefore improving the quality of the seal between glass plate, sealing ring and housing.

With the generally rectangular housing it suffices if the housing is provided with spring clips only on its longer sides, its shorter sides being provided with attachments having screw holes. The inner edge of the cover plate resting on the glass plate has a particularly advantageous effect in this embodiment because a contact pressure on the glass plate is obtained which ensures a reliable sealing even in the area of the shorter sides where the spring clips have no action.

According to another advantageous embodiment the cover plate has screw holes which are aligned with the screw holes of the attachments. Preferably the construction is such that at the rear the attachments form a supporting edge and the outer edge of the cover plate is located somewhat in front of the supporting edge level. The cover plate preferably then presses exclusively with its inner edge via the glass plate and sealing ring against the housing. Particularly advantageous with this embodiment is the fact that the assembly screws which fix the reflector in an opening of a wall via the attachments exert a force directly on the inner edge of the cover plate, so that the quality of the seal is just as good on the shorter sides as on the longer sides provided with the spring clips.

According to another preferred embodiment the housing is a substantially U-shaped drawn aluminium section which at a distance from the U-shaped members corresponding to the sealing ring diameter has webs of a somewhat lesser height. In this way a reception chamber for the sealing rings is obtained and simultaneously the U-shaped members secure the lateral position of the inserted glass plate. The webs and slot are appropriately formed by reaming a U-shaped section or using a section material. Preferably fixing and reinforcing projections are shaped onto the back of the section.

Particularly advantageously the housing and optionally the cover plate are extruded from plastic.

The spring clips are preferably U-shaped and appropriately have reinforcing seams at the ends, whilst appropriately the back of the housing is provided with projections or grooves in the area of the reinforcing seams. In this way after fitting, the reinforcing seams of the springs snap firmly into place, so that there is no danger of the spring clips falling out even with rough handling.

The spring clips preferably continuously cover the long sides of the glass plate, which ensures in the side areas thereof a uniform pressing of the glass plate against the sealing ring, which is preferably in the form of an O-seal and should be relatively soft to ensure the desired sealing around it.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims.

FIG. 1 a plan view of the reflector according to the invention with cover plate.

Figure 2:
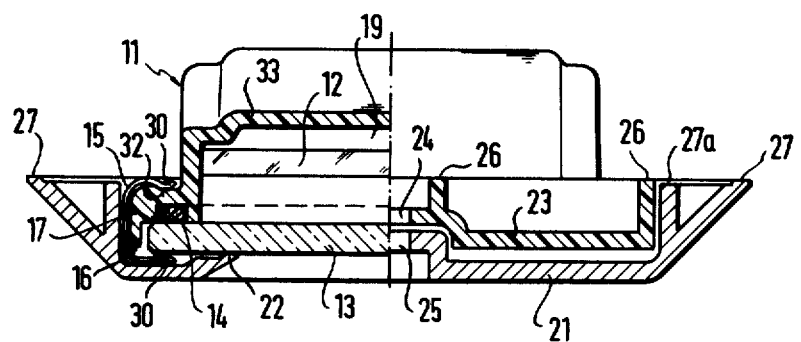

FIG. 2 a section along the line II—II of FIG. 1

Figure 3:
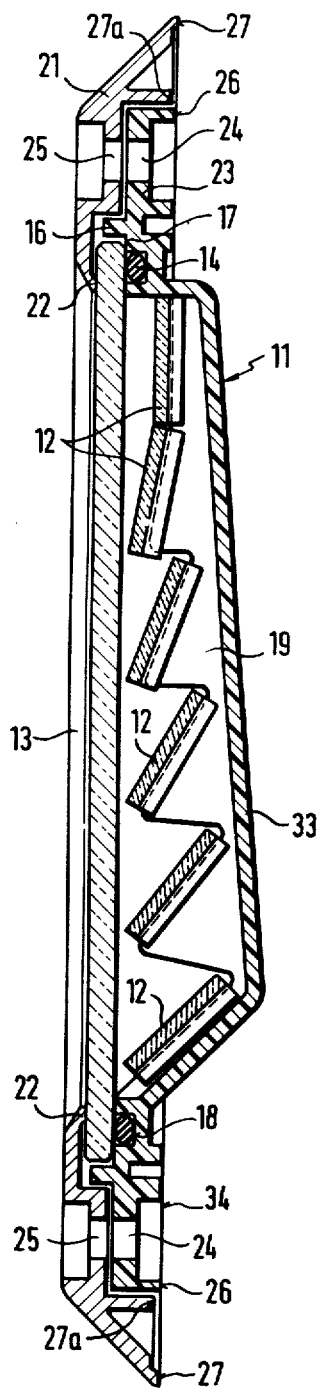

FIG. 3 a section along the line III—III of FIG. 1

Figure 4:
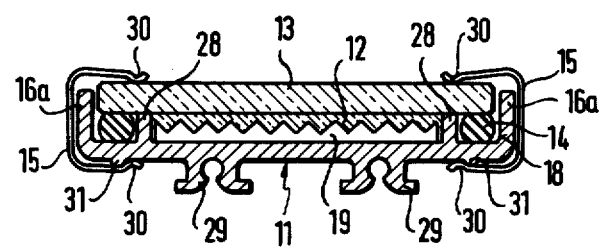

FIG. 4 a cross-section of another advantageous embodiment of the reflector according to the invention According to FIGS. 1 to 3 in a housing 11 a reception space 19 is provided for a total of six reflector plates 12 which are increasingly inclined from top to bottom in FIG. 3 resulting in the inclined base 33 of housing 11.

The housing has a peripheral annular step 17 in which there is also a peripheral slot 18. In the slot is provided an O-seal 14 whose diameter is such that in the uncompressed state it projects somewhat above the annular step 17.

On annular step 17 is placed a glass plate 13 which according to FIG. 2 is pressed against sealing ring 14 by a U-shaped spring clip 15. Spring clip 15 embraces the housing and by means of reinforcing seams 30 provided on its ends snaps into grooves 32 on the back of the housing. On the side of the glass plate the member of spring clip 15 embraces the edge 16 of housing 11 which is somewhat lower than the height of glass plate 13 and rests with reinforcing seam 30 on the front of glass plate 13.

The thus described arrangement forms a completely sealed unit.

FIG. 4 shows another embodiment, wherein housing 11 comprises a drawn aluminium section with U-shaped members 16a which has webs 28 at a spacing corresponding to the diameter of sealing ring 14. On the back of the aluminium section are also shaped projections 29 which function as stiffeners and optionally serve as a suitable attachment means. In the embodiment according to FIG. 4 reflector plate 12 comprises one or more rectangular or hexagonal elements which, unlike in the embodiments of FIGS. 1 to 3 are all in the same plane.

The advantage of the embodiment of FIG. 4 is that through the selection of a suitably long aluminium section reflectors of random length can be produced in a simple manner. The spring clips 15 need not comprise one piece extending over the complete length of the reflector but can be subdivided into individual springs of appropriate length which are placed flush against one another.

Furthermore in the embodiment according to FIGS. 1 to 3 a cover plate 21 with a rectangular window 20 is provided which permits the passage of beams of light to the reflector plates 12. Cover plate 21 has an inner edge 22 around the window 20 which according to FIGS. 2 and 3 rests peripherally on the top of glass plate 13.

On the two short sides housing 11 has attachments 23 with screw holes 24 to which correspond screw holes 25 in the cover plate.

On the back of attachments 23 is provided a supporting edge by means of which they can be placed against a front mounting surface 34 having an opening for the insertion of the reception chamber 19 of housing 11. The arrangement is fixed to the mounting surface 34 by means of screws passed through the screw holes 24, 25.

According to the invention the outer edge 27 of cover plate 21 must rest on surface 34, whereas all the remaining parts except for inner edge 22 but including the other outer edge 27a have a certain spacing from the parts located below the same, as can be seen particularly clearly from FIGS. 2 and 3. If the cover plate is now screwed to mounting surface 34 inner edge 22, in addition to spring clips 15, presses against the surface of glass plate 13 which is therefore also pressed firmly against seal 14 in the area of the short sides.

Whereas in the embodiment of FIGS. 1 to 3 grooves 32 are provided on the back of the housing to receive the reinforcing seams of the spring clips ribs 31 are shaped onto the back of the aluminium section of FIG. 4 behind which are located the reinforcing seams 30.

While there has been described and illustrated the preferred embodiments of the invention, it is to be understood that these are capable of variation and modification, and it is therefore not desired to be limited to the precise details set forth, but to include such modifications and alterations as fall within the scope of the appended claims.

What is claimed is:

1. A reflector apparatus for use with photoelectronic equipment, said apparatus comprising:
   a. a housing defining an opening in one side thereof and having a flanged portion about at least a portion of its periphery;
   b. at least one reflective element positioned in said housing and having a reflective surface disposed toward said opening;
   c. a transparent member positionable over said opening;
   d. a relatively soft resilient sealing member interposed between said housing and said transparent member and being peripherally disposed with respect to said opening, and
   e. at least one substantially U-shaped spring clip separate from said sealing member and engageable for extending around said flanged portion of said housing, said transparent member and said sealing member for demountably compressing said transparent member and said sealing member against said housing to form a sealable unit.

2. The apparatus of claim 1, wherein:
   said housing has a stepped portion peripherally extending about said opening for accommodating said transparent member, said stepped portion further defining a groove extending along said stepped portion for accommodating said sealing member, and wherein said housing defines a chamber for accommodating said reflective element within the interior boundary of said stepped portion.

3. The apparatus of claim 2, further comprising:
   a cover plate positionable over said transparent element and defining a window over the area of said reflective element, said cover plate including a flanged portion extending about the periphery of said window and being engageable with said transparent element when said cover plate is positioned over said transparent element.

4. The apparatus of claim 3, wherein said cover plate engages said transparent member solely by means of said flanged portion about said window.

5. The apparatus of claim 3, wherein at least one of said housing and said cover plate is made of extruded plastic material.

6. The apparatus of claim 3, wherein each said spring clip has a length sufficient to enable them to extend substantially along the entire length of one of the sides of said housing.

7. The apparatus of claim 1, said housing comprising a substantially U-shaped drawn metallic portion having webs located proximate said sealing element.

8. The apparatus of claim 7, wherein said housing defines mounting and reinforcing projections integrally shaped into the configuration of said housing.

9. The apparatus of claim 1, wherein a plurality of said spring clips define reinforcing seams shaped integrally in the ends of the spring clips.

10. The apparatus of claim 9, wherein said housing defines recessed portions engageable with said reinforcing seams of said spring clips to facilitate engagement of said housing by said spring clips.

11. The apparatus of claim 1, wherein said sealing element comprises an O-ring.

12. A reflector apparatus for use with photoelectronic equipment, said apparatus comprising:
   a. a generally rectangular shaped housing defining an opening in one side thereof, and defining threaded holes positioned along its shorter sides;
   b. at least one reflective element positioned in said housing and having a reflective surface disposed toward said opening;
   c. a transparent member positionable over said opening;
   d. a sealing member interposed between said housing and said transparent member and being peripherally disposed with respect to said opening; and,
   e. a plurality of spring clips disposed only along the longer sides of said housing, and being engageable with said housing and said transparent member for demountably locking said transparent member and said sealing member against said housing to form a sealable unit.

13. The apparatus of claim 12, further comprising: a cover plate positionable for defining a window over the transparent element, wherein said cover plate defines second threaded holes which are aligned with said threaded holes of said housing when said cover plate is positioned over said opening.

14. The apparatus of claim 12, wherein:
   a. said housing comprises projections extending outwardly from its shorter sides through which said threaded holes are defined; and,
   b. said projections also defining surfaces engageable with a mounting surface distinct from said apparatus upon which said apparatus is mountable.

* * * * *